Sept. 29, 1931.  A. F. VICTOR  1,825,253
MOTION PICTURE APPARATUS
Filed Jan. 21, 1929  3 Sheets-Sheet 1
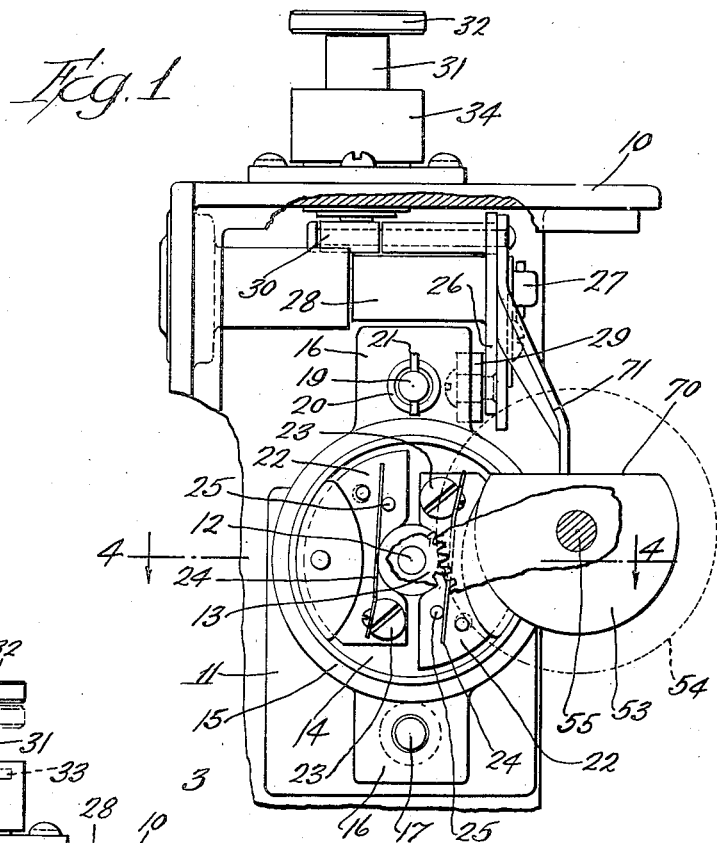
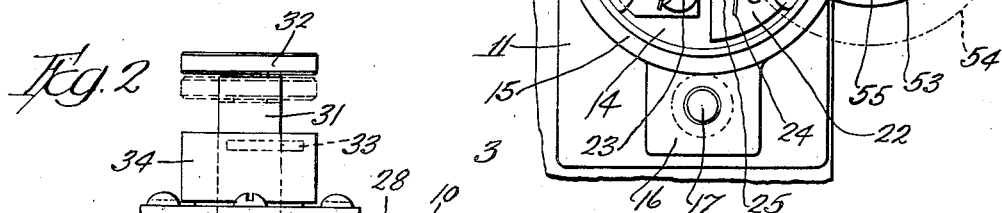
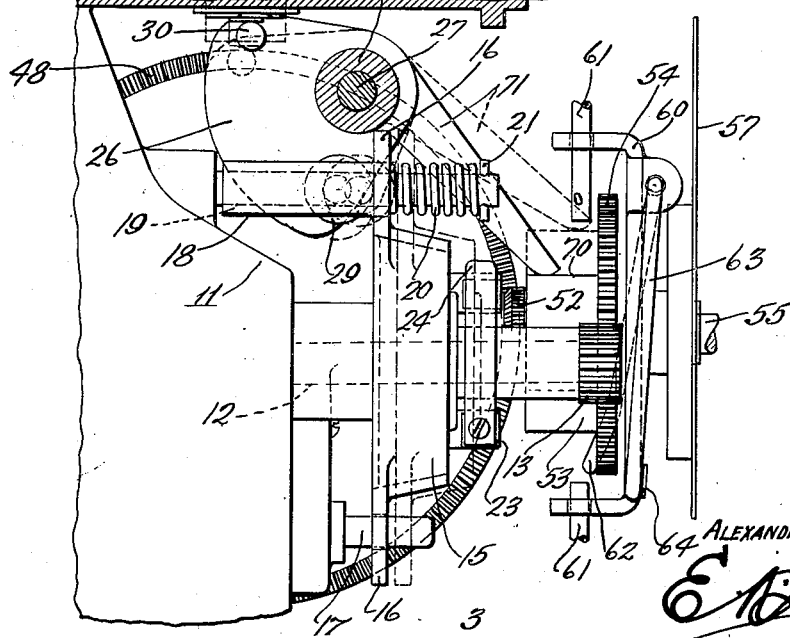
Inventor:
ALEXANDER FERDINAND VICTOR Sept. 29, 1931.      A. F. VICTOR      1,825,253
MOTION PICTURE APPARATUS
Filed Jan. 21, 1929      3 Sheets-Sheet 2

Inventor:
ALEXANDER FERDINAND VICTOR

Sept. 29, 1931.  A. F. VICTOR  1,825,253
MOTION PICTURE APPARATUS
Filed Jan. 21, 1929   3 Sheets-Sheet 3
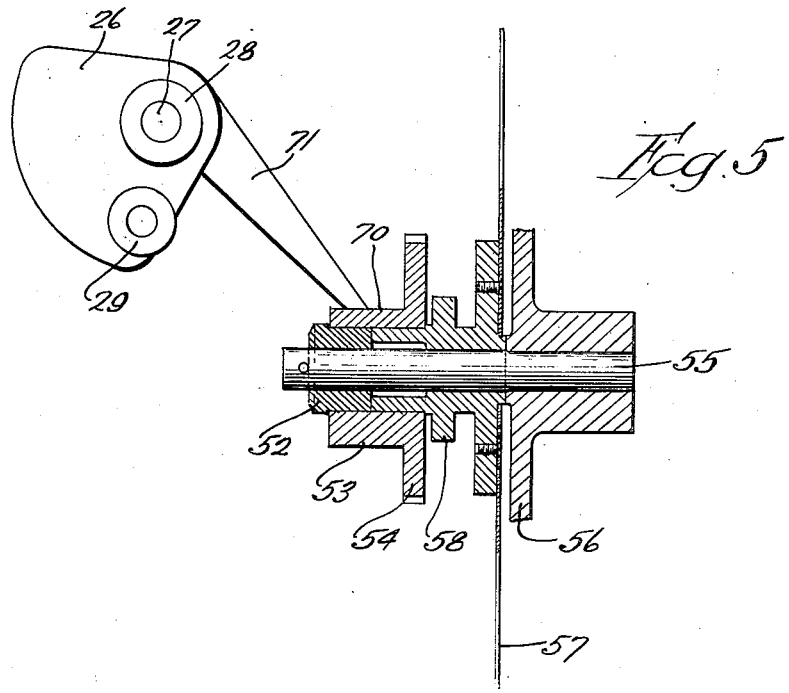
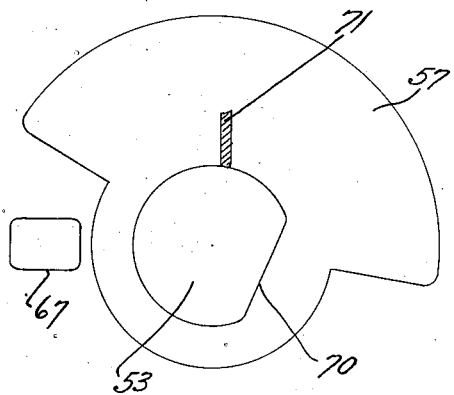
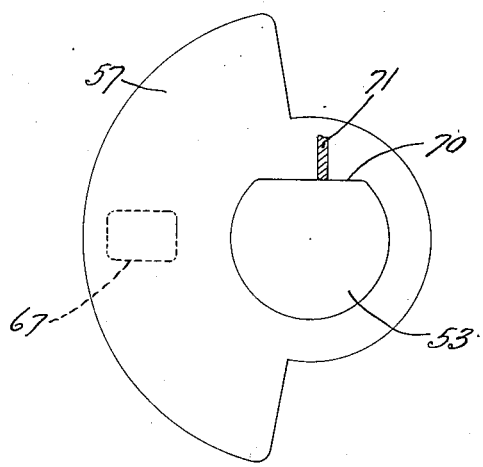
Inventor:
ALEXANDER FERDINAND VICTOR Patented Sept. 29, 1931

1,825,253

UNITED STATES PATENT OFFICE

ALEXANDER FERDINAND VICTOR, OF NEW YORK, N. Y.

MOTION PICTURE APPARATUS

Application filed January 21, 1929. Serial No. 334,069.

My present invention relates to motion picture apparatus and the like and has more particular reference to cinematographic cameras and particularly to means to control and synchronize the motion and arrest of the feeding devices with respect to the shutter. In cameras for photographing motion-pictures, provision is sometimes made for permitting the film feeding devices to travel at several speeds so that the film is advanced at the corresponding or predetermined speeds. The present camera is of smaller size than the commercial type employed for professional use, and its parts and assembly have been reduced to the minimum consistent with efficiency and dependability with the result that the apparatus is extremely compact in arrangement and is light to handle. The camera is adapted for amateur use and employs the well-known miniature 16-mm. film on spools containing approximately one-hundred feet of film.

In photographing motion pictures it is of course desirable after taking a scene to always stop the advance of the film with the shutter in a closed position in order to avoid spoiling any of the film. When the film feeding devices are capable of several speeds it is sometimes difficult to insure a positive stoppage or arrest the film at the desired movement, and it frequently occurs that when ultra-rapid speed is attained for the purpose of "slow-motion" pictures the speed of the advancing mechanism is so great that an instantaneous stoppage with the shutter in closed position is a difficult proposition and if stopped too sudden is liable to jar or vibrate the camera. This jarring is especially noticeable where an arm is pushed out into the path of the stop pin or lug on one of the moving or rotatable parts of the mechanism. With my hereinafter disclosed mechanism I have synchronized the movement of the shutter with the film feeding devices and have provided additional devices that cooperate with control mechanism, so that, when the latter is released to return to normal, the stoppage of the film is momentarily postponed until the shutter is in position in front of the exposure aperture, whereupon the movement of all mechanism is arrested. This is accomplished in a novel and dependable manner so that it positively insures the proper positioning of the shutter in front of the aperture at the moment the movement of the film ceases and the stoppage is made without jar to the camera. The structure for accomplishing this function is simple and will not readily get out of order and its parts are made and so arranged that no difficulty is experienced in reassembly of the mechanism should it be found necessary to take the camera apart.

I prefer to carry out my invention and to accomplish the various objects thereof in substantially the manner hereinafter fully described and as more particularly pointed out in the claims, reference being herein made to the accompanying drawings that, for, a part of the specification.

In the drawings:

Figure 1 is a front elevation of a portion of a motion-picture camera showing the application of my invention thereto.

Figure 2 is a vertical side elevation of the structure shown in Figure 1.

Figure 5 is axial section on a vertical plane disclosing the structure and mounting of the shutter, cams and gears at the front of the camera.

Figures 6 and 7 are schematic views of the shutter and its control devices showing them in different relative positions with respect to the exposure aperture.

The drawings illustrate a typical or preferred form in which my invention may be made, said drawings being somewhat schematic, and throughout the figures the same reference characters have been employed to designate like parts wherever they appear.

Figure 3:
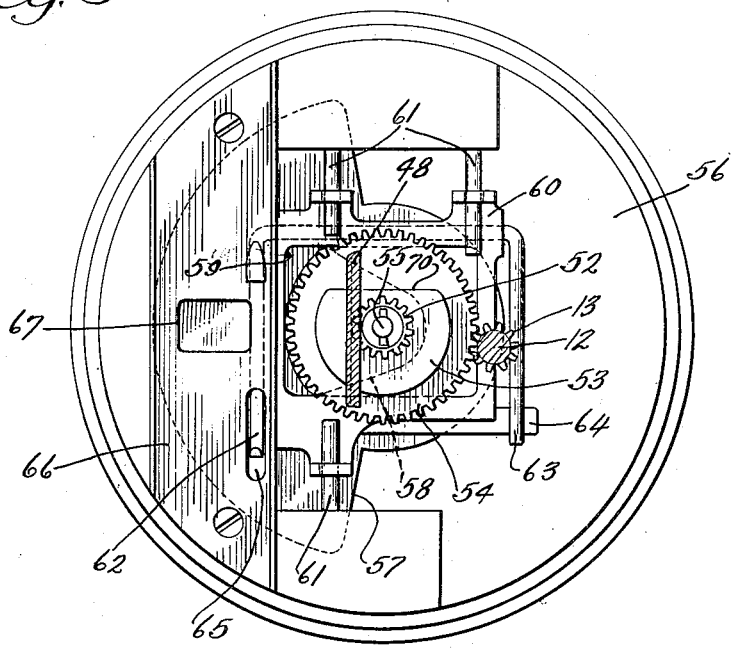
Figure 3 is a transverse vertical section, taken on line 3—3 of Figure 2 and looking in the direction of the arrows, to disclose the film-engaging elements and associated parts.
Figure 4:
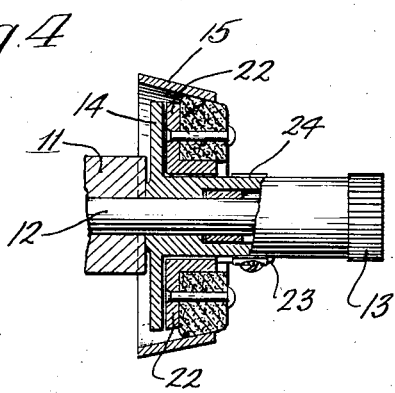
Figure 4 is an axial section, taken on line 4—4 of Figure 1 and looking in the direction of the arrows to show details of the speed control brake.

The control device and the associated mechanism, while shown enlarged, is adapted for and has been especially designed for installation in small cameras for amateur use wherein the driving motive power is usually in the form of a large clock spring the energy of which is utilized by releasing a latch or other suitable element that will also act as a stop to discontinue movement thereof and arrest the advance of the film. The film is of the miniature type of 16 mm. in width, such as employed in the small cameras and projectors for personal use and is approximately one hundred feet in length.

One of the walls of the camera structure which is designated as 10, is preferably in the form of a flat plate and adjacent the plate or wall is an irregular shaped casting 11 that is so shaped that a portion of the driving mechanism may be mounted thereon. This driving mechanism, as before stated includes a heavy clock spring that is suitably mounted and housed within the casing and is adapted through any desired transmission mechanism, to actuate the rotatable shaft 12 mounted on the supporting casting 11, the action of said shaft being derived through the pinion 13 upon its end. A clutch disk 14 is mounted upon the shaft so that it rotates in a movable clutch ring 15, the interior surface of which is tapered as indicated by dotted lines in Figure 2 so that the clutch ring may be said to be of frustum-conical shape. Apertured ears 16 project radially from diametrically opposite portions of the ring, the lower ear being engaged with a guide stud 17 projecting from the supporting casting 11, while the other ear is provided with a tubular extension 18 that is slidably and telescopically mounted upon a spindle 19 projecting from casting 11. A coiled spring 20 surrounds the spindle between the adjacent ear of the ring and a step pin 21 that is passed through the outer end portion of the spindle 19 so that the clutch ring is normally urged towards the supporting casting 11 and with its base nearest said casting. The friction members of the clutch are in the form of a pair of segmental shoes 22 mounted eccentrically by means of pivot screws 23 upon the clutch disk 14, which shoes are normally urged towards the center of the disk by means of light springs 24 that are mounted upon the pivot screws and extend across the segments to the projections 23 extending laterally from the segments. The working edges of these shoes are segments that conform in shape with the adjacent inner surfaces of the clutch ring 15 and when the latter is in its normal position as shown in the drawings there is sufficient friction between these parts to overcome the tendency of the motor or clock-spring and the transmission mechanism to actuate the rotatable element 12 and thus hold the film and its advancing mechanism at rest. When, however, the clutch ring is moved slightly toward the outer end of rotatable element 12 the clutch shoes 22 will be released slightly and the rotation of the parts takes place. The speed at which the elements and the shoes rotate is controlled by the degree to which the shoes are released and depends upon the space between the edges of said shoes and internal surface of the clutch ring, and it will be understood that the farther these parts are separated the greater the degree of release and the faster the rotatable elements 12 will be moved to advance the film at different speeds. By controlling the adjustment of the clutch ring to certain definite positions, speeds of different velocities may be attained and this adjustment is accomplished through the medium of a single control member and the intermediate structure which co-ordinate it with the clutch ring.

A bell-crank or other suitable cam element 26 is mounted eccentrically upon a fulcrum or pivot 27 projecting from the supporting casting 11, the part 26 being provided with a tubular extension 28 that surrounds the spindle a portion of its length thereby affording an elongated bearing for the cam element. The bell-crank or cam-element is shown as of a triangular shape with its pivotal axis adjacent one of its corners, and at the corner below said pivot there is a roller 29 that is placed with its peripheral edge in engagement with the adjacent surface of the ear at the upper end of the clutch ring 15, which surface is back of that engaged by the spring 20. By moving the cam element in the proper direction the clutch will be moved against the urge of spring 20 and will release the shoes to the extent to which the clutch ring is moved. There is a lateral projection in the form of a stud or pin 30 at the third or remaining corner of the cam element 26 that is utilized for the purpose of operating the cam element by means of the single control button or plunger, which latter will now be described.

The control element is in the form of a reciprocable plunger 31 having a disk-like enlargement or button 32 upon its upper end that is provided with an arrow or other pointer to indicate the position of a guide-pin 33 that projects radially from the shank of the plunger. The lower end of the plunger bears against the cylindrical surface of the projection or stud 30 on the cam element so that the reciprocation of the plunger will rock said cam element. A tubular sleeve 34 surrounds the plunger and encloses an expansion spring that urges the plunger normally in a downward direction and slots of different lengths in the sleeve determine the position and extent of depression that may be given the plunger.

With the above described structure the degree to which the clutch members are released is readily controlled by the distance the plunger or button is depressed and as such distance will vary according to the speeds desired, provision is made to permit the depression of the button to different positions. By pulling out the plunger or button until the guide pin 33 clears the outer edge of the sleeve and then rotating the plunger or button until the pin comes to rest in a small notch or recess in the upper edge of the sleeve, the lower end of the control member will be in such position with respect to the projection 30 on the cam element that the latter may not be rocked to release the clutch members. This locks the mechanism against accidental operation. To actuate the film at normal cinematographic speed, the control member may be lifted to disengage the lock notch and then moved until the pin 33 registers with the proper slot and then depressed, which will cause the separation of the clutch ring and shoes to a degree that will permit the mechanism to move at the desired normal speed, and if it be desired to continue this speed for a period of time the control member may be rotated slightly so as to position the pin 33 in a lateral portion of the slot. Ultra-speed may be attained by registering the pin 33 with another slot or groove in the sleeve that is of greater extent than the other slots or grooves so that when the pin 33 has reached the inner end of said groove the control member will have been depressed to its fullest extent and the clutch ring will have been thereby moved as far as possible from the shoes to permit the mechanism to move at its fastest speed in order to photograph pictures that are to be projected on the slow-motion principle. Other slots or grooves may be produced in the bushing to permit the control member to be depressed different distances in order to attain other speeds for the advance of the film. It will be seen the slots or grooves are of different lengths and the operator may readily obtain the speed desired by selecting the same with a pointer or arrow on the top of the control member and then operating the device in the manner herein-before described.

The transmission or intermediate mechanism, mentioned at the beginning of the description, actuates the film moving devices and the shutter of the camera through the medium of the structure now to be described and is controlled by the structure hereinbefore explained. A large idle gear 46 derives its motion, through the spring motor clockwork housed in a chamber within the camera casing. The idle gear 48 meshes with and actuates a pinion 52 having its axis at a right angle to the axis of the idle gear, and said pinion forms a portion of the counter-balance hub 53 of a gear 54 that meshes with the pinion 13 on the adjacent end of the rotatable shaft 12 with which the clutch governor is associated. Thus, through the above-described intermediaries, the shaft which is controlled by the button plunger, is actuated by the motor and the film feeding mechanism and shutter are interposed between the motor and the control device so as to be under the direct influence of the latter.

The film feeding mechanism may be similar to that disclosed in my co-pending application for Letters Patent executed even date herewith for a "Film control device" and filed May 17, 1929, Serial No. 363,768.

The double gear 52—54 is mounted upon the spindle 55 that projects inwardly from the circular front plate of the camera casing, and the segmental shaped shutter 57 is connected with said gear and also rotates upon said spindle, while intermediate the shutter and gear there is a cam 58 that moves said elements to actuate the film feed mechanism, in synchronism with the shutter.

The cam operates in a rectangular opening 59 made in a slide 60 to reciprocate the latter on the three guides 61; said slide carries the yieldable film-engaging finger or pin 62 that is in the form of an inverted U-shaped wire the transverse or connected portion of which is rockably mounted on the slide so that one of the parallel arms of the U provides the finger 62, with the opposite arm 63 is urged away from the casing plate 56 by the spring 64. The end of this film engaging finger 62 is operable in the elongated slot 65 of the aperture plate 66 that forms a portion of the usual film passageway or guide, and when reciprocated the finger engages the marginal perforations in the film to intermittently feed the latter in a downward direction through the passageway and past the aperture 67.

By positioning the guide-pin 33 of the control plunger or button in alinement with the selected slot or groove in the sleeve 34 and then depressing the same, the brake structure will be released to the proper extent to permit the mechanism to move at the selected or predetermined speed thus actuating the film-feeding device and shutter at a corresponding speed. Thus the film may be moved at any of the predetermined speeds and the operator may select the speed desired by means of a single control element upon the exterior of the casing which of course materially facilitates the use of the camera.

The structure which controls the feed mechanism so that it is stopped when the shutter is in proper position in front of the exposure aperture 67 of the camera so that the latter will be closed upon cessation of the film feed, consists of suitable mechanism that is moved by the depression of the brake-control plunger, to release the mechanism so that it will actuate the film feeding devices. When the plunger returns to normal upon application of the brake, the shutter will stop in a predetermined position with respect to the exposure aperture so that the aperture is closed and the film is not exposed to the action of the light rays. The hereinafter mentioned counter-balance hub 53 is in the form of a cam of cylindrical shape having a flattened portion 70, and as shown in section in Figure 5, this cam hub, the gears 52 and 54, the slide actuating cam 58, and the shutter are all assembled as a single unit upon the spindle 55 in order that these elements may rotate simultaneously and at the same speed. The shutter is of the usual segmental shape so that during rotation thereof the exposure aperture 67 will be alternately opened and closed, and the diagrams in the drawings (Fig. 6 and 7) illustrate the relation of the elements and especially the position of the flattened portion of the cam with respect to the parts of the shutter that closes the aperture.

The control element that cooperates with the cam is an oscillating arm 71 that projects forwardly from the brake operating bellcrank 26 and it slopes downward towards the cam hub 53 so that its free end normally bears upon the flat or narrow portion 70 of said cam, and in this position the control plunger 31 is in a fully raised position to apply the brake and prevent driving movement of the motor or advance of the film.

Upon depressing the plunger 31 the brake releases the film feeding mechanism to the predetermined extent to advance the film at the desired speed and the arm 71 has also been raised as shown in dotted lines in Figure 2 to a position where its free end will clear the cylindrical surface of the cam 53. This will release the film engaging elements so that the film feeding operation starts the simultaneous and synchronized rotation of the shutter 57 in front of the exposure aperture 67.

When pressure is released on the plunger 31 to stop the mechanism the end of the arm, due to the normal urge of the return spring 20 will press upon whatever surface of the cam is adjacent it. If the contacted cam surface is cylindrical the arm will be held in its raised position and permit the cam and the parts on the spindle 55 to revolve until the flat portion 70 of the cam is contacted by the end of the arm, whereupon said arm will move to its normal position shown in full lines in Figure 2 which permits the bellcrank 26 to rock back to normal and apply the brake. This arrests the movement of the film feeding devices at a moment when the full portion of the shutter is in front of the exposure aperture and closes the latter. It will be understood that in lieu of the flat or narrow portion 70 on the cam, a depression or radial slot may be made in the surface of a cylindrical hub, which depression or slot being of a depth sufficient to permit the end of the arm 71 entering the same to such an extent that the brake will be rendered effective to stop the film feeding devices. In connection with this control mechanism it will be understood that the urge of the brake return spring 20 is sufficient to rock the bellcrank 26 and force the end of the arm down to its lowermost or normal position.

The foregoing detailed description and drawings have been given for clearness of understanding only, and no unnecessary limitations should be understood therefrom, but the appended claims should be construed as broadly as permissible in view of the prior art.

What I claim is:—

1. A device of the kind described comprising film feeding devices, manually controlled means for arresting movement of the feed devices, a rotatable shutter actuated by said feed devices, an arm extending from a portion of the arresting means, and a rotatable element connected to said shutter and adapted to be engaged by said arm to operate the arresting means at a predetermined position of the shutter.

2. A device of the kind described comprising film feeding devices, manually controlled means for arresting movement of the feed devices and including a rocking member, a rotatable shutter actuated by said feed devices, an arm extending from said rocking member, and a rotatable element connected to said shutter and adapted to be engaged by said arm to operate the arresting means at a predetermined position of the shutter.

3. In a motion-picture apparatus the combination with film-feeding devices and a shutter, and means for actuating the same, of a cam operable with said shutter, control mechanism connected with said means, a member connected to said mechanism that clears said cam during the operation of the shutter and is adapted to engage said cam to operate the control mechanism with the shutter in a predetermined position, and manually operated means for releasing and stopping said control mechanism and for initially moving said cam engaging member.

4. In a motion-picture apparatus the combination with film-feeding devices, and a shutter, and means for actuating the same, of a cam operable with said shutter, control mechanism connected with said means, an oscillating arm connected to said mechanism and a portion of which clears said cam during the operation of the shutter and is adapted to engage said cam to operate the control mechanism with the shutter in a predetermined position, and manually operated means for releasing and stopping said control mechanism and for initially moving said arm.

5. In a motion-picture apparatus the combination with film-feeding devices and a shutter, and means for actuating the same, of a cam operable with said shutter, control mechanism connected with said means, a pivoted arm connected to said mechanism and the free end of which clears said cam during the operation of the shutter and which is adapted to engage said cam to operate the control mechanism with the shutter in a predetermined position, and manually operated means for releasing and stopping said control mechanism and for initially moving said arm.

6. In a motion-picture apparatus the combination with film-feeding devices, and means for actuating the same, of a cam operable with said shutter, control mechanism connected with said means, an arm pivoted at one end on said mechanism and with its free end engaged normally with said cam to operate said mechanism to arrest the feed and maintain the shutter in a predetermined position, and manually controlled means for moving said arm to clear its free end from said cam and permit operation of the feed and the shutter, whereby the return of said arm will operate the control mechanism with said shutter at its predetermined position.

7. In a motion-picture apparatus the combination with film-feeding devices and a shutter, and means for actuating the same, of a brake controlling said actuating means, a cam actuated by said means and connected with said shutter, manually controlled devices for operating said brake to control speed of the film feeding devices and shutter, and a member oscillated by said brake operating devices to move into and out of co-active relation with said cam whereby the feed mechanism is stopped with said shutter at a predetermined position and the mechanism is released when said member is moved away from said cam.

8. In a motion-picture apparatus the combination with film-feeding devices and a shutter, and means for actuating the same, of a brake controlling said actuating means, a cam actuated by said means and connected with said shutter, manually controlled devices for operating said brake to control the speed of the film feeding devices and shutter, and a pivoted arm operatively connected with the brake control devices and normally engaged at its free end with said cam, said arm adapted to be oscillated by said brake operating devices to move into and out of co-active relation with said cam whereby to permit operation of the brake with said shutter and said brake is released when said arm is moved away from said cam.

Signed at Chicago, in the county of Cook, and State of Illinois, this 5th day of May, 1928.

ALEXANDER FERDINAND VICTOR.